Dec. 23, 1969  T. GOOSMANN  3,485,112
RELEASABLE CONNECTION
Filed Oct. 24, 1967
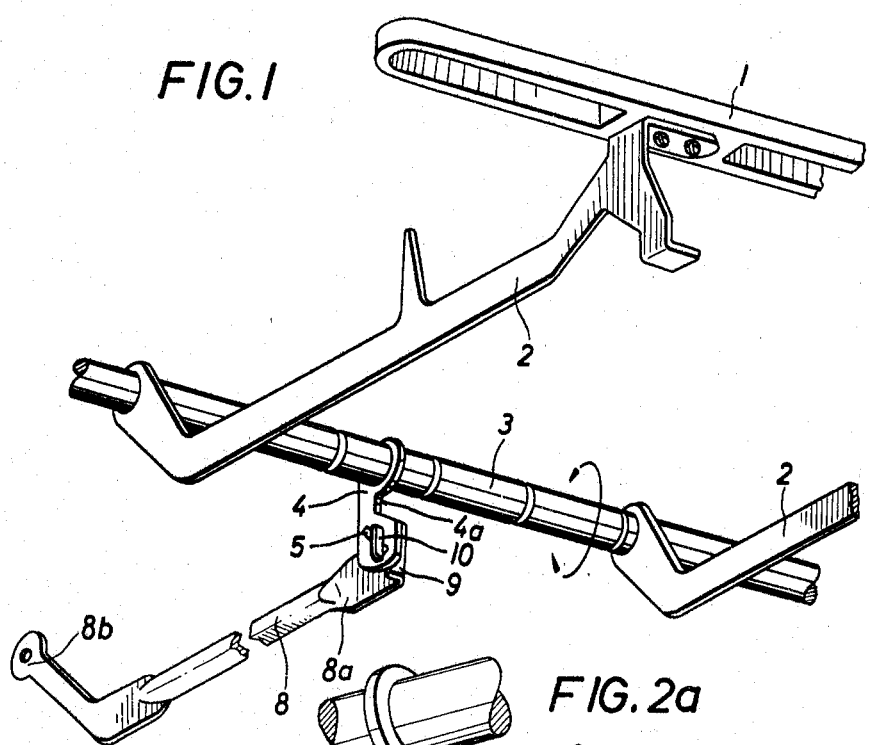
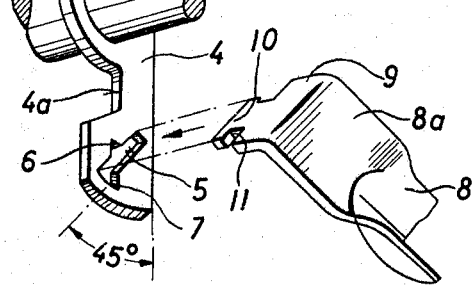
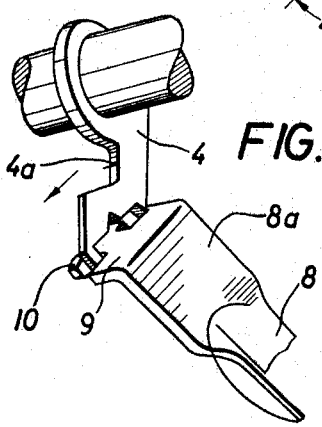
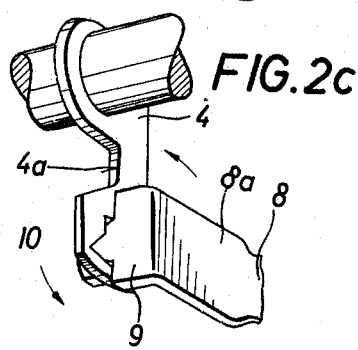
INVENTOR:
Theo Goosmann
BY Michael S. Striker,
ATTORNEY United States Patent Office 3,485,112
Patented Dec. 23, 1969

3,485,112
RELEASABLE CONNECTION
Theo Goosmann, Heidmuhle, Germany, assignor to
Olympia Werke AG., Wilhelmshaven, Germany
Filed Oct. 24, 1967, Ser. No. 677,583
Claims priority, application Germany, Oct. 28, 1966,
O 9,052
Int. Cl. G05g 1/00; F16b 7/00, 9/00
U.S. Cl. 74—579                                      11 Claims

ABSTRACT OF THE DISCLOSURE

A first elongated member is mounted on a rotary shaft for movement therewith and extending transversely thereof, and has a first free end portion. A second elongated member also has a second free end portion. The first free end portion is provided with an elongated slot-like cutout, and the second free end portion provided with a T-shaped connecting portion which, in one position of the two members relative to one another, can be inserted into and removed from the cutout, but cannot be removed when the members are turned to other positions relative to one another.

BACKGROUND OF THE INVENTION

The present invention relates to connections in general, and more particularly to releasable connections. Still more specifically, the present invention relates to a releasable connection between components of typewriters, adding machines, and analogous structures.

It is well known that adding machines, typewriters and other devices of this same general type utilize a large number of linkages, each of which consists of two or more lever members which must be connected to one another. This is particularly true of the type of arrangement where one lever member is mounted rigidly on a rotary shaft for rotation therewith, and another level member transmits motion to or receives motion from the first lever member and is connected thereto. For such connections, by means of which various motions are transmitted, for instance on depression of a key, it is known to utilize bolt and nut connections, or else rivets. Particularly in circumstances where it is necessary to permit fine adjustment of the connected members relative to one another one end of one of the members, usually an end of the member which is directly connected to the rotary shaft, is frequently provided with an elongated hole through which the bolt extends which connects the other member to the member carried by the rotary shaft. This permits adjustment of the position of the two members with reference to one another by loosening the connection, placing the members in the desired position, and tightening the connection again. However, this type of adjustment is rather difficult, and particularly undesirable about this type of connection is the fact that whenever the connection must be loosened for any reason whatsoever, the fine adjustment must be repeated. In other words, it is not possible to release the connection for a given reason, and subsequently to restore the connection with the two members being connected again in the same manner in which they were connected before. Rather, fine adjustment must be effected whenever the connection is released and subsequently restored.

Evidently, this is not only undesirable from a point of view of expense in the maintainence and repair of machines so constructed, but also the relatively large number of components required, namely a bolt, a nut, a washer, makes this type of connection relatively inexpensive. Also, initial assembly of the various parts is time-consuming and therefore increases the expense of machines utilizing such connections.

SUMMARY OF THE INVENTION

The present invention overcomes these disadvantages.
More particularly, the present invention provides a releasable connection which is very simple and requires no separate components for establishing a connection.

The releasable connection in accordance with the present invention can be released and re-established at will and any desired number of times without requiring subsequent fine adjustment of the position of the connected components with reference to one another.

In accordance with one feature of my invention I provide, in a typewriter, adding machine or analogous device but also usable in other applications, a rotary shaft, a first elongated member which is carried by the shaft extending transversely thereof and sharing the rotary movements of the same and provided with a first free end portion, and a second elongated member which has a second free end portion. Cooperating male and female coupling portions are provided on the respective end portions and releasably connect the same to one another. In accordance with my invention these coupling portions are constructed and arranged so as to be disengageable from one another only in a predetermined position of said members relative to each other, whereas the connection cannot be disengaged when the members are in positions other than this predetermined position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a fregmentary somewhat diagrammatic illustration of an arrangement embodying my invention;

FIG. 2a shows the members to be connected in a first position relative to one another preliminary to effecting of the connection;

FIG. 2b is somewhat similar to FIG. 2a, but showing the members to be connected in a further stage in which the connection is not yet completed; and FIG. 2c is a view similar to FIGS. 2a and 2b, but showing the members to be connected in a condition in which the connection is effected.

DESCRIPTION OF THE PREFERRED EMBODIMENTS

Discussing now the drawing in detail, and firstly FIG. 1 thereof, it will be seen that what I have illustrated there purely by way of example is the arrangement of a spacing-bar or spacing-key assembly. Of course, this is only by way of example and the connection can of course be employed in any situation in which a connection of the type illustrated in FIG. 1 must be effected between two members or two components.

FIG. 1 shows, as already pointed out, a spacing-bar assembly with the spacing-bar being designated with reference numeral 1. It is connected to and carried by the arms 2 which in turn are rigid with the rotary shaft 3 which can turn in the direction of the double-headed arrow associated therewith. Also mounted on the rotary shaft 3 rigid therewith, so that it will share the turning movements of the shaft 3, is a first lever 4 which extends transversely of the elongation of the shaft 3. The first lever 4 is provided with a first free end portion having formed therein a slot-shaped cutout 5 which, advantageously, is inclined at an angle of approximately 45° to the longitudinal edges of the lever 4.

FIG. 2a shows in more detail that the side walls of the cutout 5 are provided with transversely extending recesses, namely a first recess 6 provided in one side wall intermediate the ends of the cutout 5, and a second recess 7 provided in the opposite side wall at one end, namely the lower end in the drawing, of the cutout 5. These cutouts 6 and 7, it will be noted, extend in substantial parallelism with the longitudinal edges of the lever 4, but obviously not with the longitudinal extension of the slot 5.

A second lever 8 serves as a pull rod transmitting the turning movement of the shaft 3 to other components of the machine which are not illustrated as being well known and not being of any concern for the purposes of the present invention. This second lever 8 is provided with a second free end portion which in the illustrated embodiment is angled so as to provide an extension 9 which extends at a substantially right angle to the elongation of the lever 8. The extension 9 is provided with a T-shaped male coupling portion in form of a projecting neck 11 and a head 10 which extends transversely of the neck 11 and laterally beyond the latter. The configuration of the head 10 is such that it can be received in the cutout 5. The length of the neck 11, that is the dimension thereof between the extension 9 and the head 10, corresponds at least to the thickness of the first lever 4, so that when the male coupling portion is inserted into the cutout 5 from one side of the lever 4, the head 10 can be advanced until it is located outside the cutout 5 and adjacent the other side of the lever 4. The transverse dimension of the neck 11, that is its dimension as seen in the direction of elongation of the head 10, is greater than the transverse dimension of the cutout 5 so that the member 8 could not ordinarily be turned with reference to the member 4 when the neck 11 is received in the cutout 5. However, by providing the recesses 6 and 7, I make such turning movement possible because the opposite side edge portions of the neck 11 are respectively received in the recesses 6 and 7, as is evident from FIGS. 2b and 2c, and the member 8 can thus be turned with reference to member 4 from the position shown in FIG. 2a, in which the head 10 can be inserted into and withdrawn from the cutout 5, as shown in FIG. 2b, to the position illustrated in FIG. 2c in which such insertion and, primarily, such withdrawal is no longer possible. The direction of movement of the member 8 with respect to the member 4 is indicated in FIG. 2c by the arrow to facilitate ready understanding.

The rear end portion 8b of the member 8, that is the end portion opposite the front or second end portion 8a which is provided with the extension 9, carries a suitable hole or similar expedient so that it may be connected to the other components of the machine, as mentioned earlier.

It is clear that with the present connection the components which are to be secured to one another, namely the members 4 and 8, can be connected and disconnected whenever desired and for a substantially unlimited number of times and that they will always be located in predetermined relationship with reference to one another when the connection is re-established, without requiring the type of adjustment necessary where an elongated slot and a bolt and nut connection was utilized heretofore. If an adjustment is necessary, and this would ordinarily occur only during the initial assembly, the member 4 and thereby the member 8 can be repositioned slightly by simply bending the member 4 somewhat in the direction in which pull or push are exerted. For this purpose the member 4 is provided with a cutout 4a in one edge thereof, this being illustrated in all figures, and this cutout constitutes a weakened portion which makes possible small changes in the adjustment by bending the member 4 and which thus allows for fine adjusting of the positioning.

Of course, as has been pointed out before, the present invention is applicable not only to the categories of machines which have been specifically mentioned, namely typewriters, adding machines and analogous devices, but can be utilized with equally good results in any situation where the type of connection in question is to be established between two components. It is also clear that under certain circumstances the cutouts 6 and 7 could be eliminated, in which case it would then be necessary that the transverse dimension of the neck 11 of sufficiently smaller than the transverse dimension of the cutout 5 to permit turning movement of the neck 11 in the cutout 5 in the same manner as illustrated in FIGS. 2a–2c, but without the aid of the recesses 6 and 7.

It will be understood that each of the elements described above, or two or more together, may also find a useful application in other types of arrangements differing from the types described above.

While the invention has been illustrated and described as embodied in a releasable connection, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A structure of the character described comprising, in combination, a rotary shaft; a first elongated member provided on said shaft extending transversely thereof, and having a first free end portion; a second elongated member extending at least substantially normal to said rotary shaft and crossing the same in space, said second elongated member having a second free end portion extending in parallelism with said rotary shaft; and cooperating male and female coupling portions provided on the respective end portions of said elongated members and being constructed and arranged so as to positively connect the same to each other in coupling position of said elongated members while being disengageable from each other in at least another position of said members relative to each other.

2. A structure as defined in claim 1, wherein said first elongated member is rigid with said shaft for rotary movement therewith.

3. A structure as defined in claim 1, wherein said female coupling portion is provided on said first free end portion, and said male coupling portion is provided on said second free end portion.

4. A structure as defined in claim 3, wherein said female coupling portion is a cut-out, said male coupling portion being configurated so as to be receivable in said cut-out when said members are in said one position relative to each other.

5. A structure as defined in claim 4, wherein said cut-out has first longitudinal and transverse dimensions, said male coupling portion including a coupling head having second longitudinal and transverse dimensions corresponding substantially to said first dimensions.

6. A structure as defined in claim 4, wherein said first free end portion has opposite sides and is of a thickness corresponding to a first distance between said opposite sides, said male coupling portion comprising a neck extending from said second free end portion by a second distance at least equal to said first distance, and a coupling head carried on said neck extending transversely therebeyond and having an outline corresponding to the configuration of said cut-out, whereby said coupling head is movable through said cut-out when said members are in said one relative position with the outline of said coupling head aligned with the configuration of said cut-out, while said coupling head is prevented from withdrawal through said cut-out when said neck extends through said opening from one to the other side of said first end portion and said coupling head is located at said other side with said members in positions other than said one position.

7. A structure as defined in claim 6, wherein said cut-out is an elongated slot, and wherein said coupling head and said neck together define a substantially T-shaped configuration.

8. A structure as defined in claim 7, wherein said neck has a width greater than the first transverse dimensions of said slot, and wherein said slot is provided in opposite longitudinal side walls thereof with outwardly directed recesses adapted to accommodate edge portions of said neck to thereby permit turning of the same and movement of said members to relative positions other than said one position.

9. A structure as defined in claim 8, wherein said recesses and said edge portions have respective dimensions admitting of limited freedom of movement of said edge portions in said recesses.

10. A structure as defined in claim 8, wherein said recesses are inclined to the direction of elongation of said slot.

11. A structure as defined in claim 3, wherein said first elongated member is provided with a weakened portion for facilitating bending of said first elongated member.

References Cited
UNITED STATES PATENTS

| | | | |
|---|---|---|---|
| 1,628,249 | 5/1927 | Kirfman | 287—64 XR |
| 1,736,373 | 11/1929 | Seeger | 287—64 XR |
| 2,163,941 | 6/1939 | Dobson | 74—579 XR |
| 3,302,430 | 2/1967 | Maursey | 287—64 XR |
| 3,357,274 | 12/1967 | Dapoz | 74—579 XR |
| 3,389,613 | 6/1968 | Turnbull | 74—110 |

FRED C. MATTERN, Jr., Primary Examiner

F. D. SHOEMAKER, Assistant Examiner

U.S. Cl. X.R.

287—64, 103